US006895720B2

(12) United States Patent
Keith

(10) Patent No.: US 6,895,720 B2
(45) Date of Patent: May 24, 2005

(54) HIGH STRENGTH COMPOSITE WALL CONNECTORS HAVING TAPERED OR POINTED ENDS

(75) Inventor: David O. Keith, American Fork, UT (US)

(73) Assignee: HK Marketing LC, American Fork, UT (US)

( * ) Notice: Subject to any disclaimer, the term of this patent is extended or adjusted under 35 U.S.C. 154(b) by 123 days.

(21) Appl. No.: 10/626,127

(22) Filed: Jul. 23, 2003

(65) Prior Publication Data

US 2004/0118067 A1 Jun. 24, 2004

Related U.S. Application Data

(63) Continuation-in-part of application No. 10/254,168, filed on Sep. 25, 2002, now abandoned.

(51) Int. Cl.[7] ............................ E04C 1/41; F16B 15/02

(52) U.S. Cl. ................................ 52/309.11; 52/309.12; 52/405.1; 52/426; 52/745.19; 411/475; 411/482; 411/488; 411/923

(58) Field of Search ......................... 52/309.11, 309.12, 52/309.17, 405.1, 404.2, 426, 427, 428, 442, 565, 742.14, 745.19; 411/473, 474, 475, 477, 478, 482, 487, 488, 923

(56) References Cited

U.S. PATENT DOCUMENTS

| | | | | |
|---|---|---|---|---|
| 963,776 | A | | 7/1910 | Kosack |
| 1,934,134 | A | | 11/1933 | Sherman |
| 2,155,893 | A | | 4/1939 | Fulton |
| 2,653,469 | A | | 9/1953 | Callan |
| 2,740,505 | A | | 4/1956 | Flora |
| 2,751,052 | A | | 6/1956 | Flora |
| 4,393,635 | A | | 7/1983 | Long |
| 4,805,366 | A | | 2/1989 | Long |
| 4,829,733 | A | | 5/1989 | Long |
| 4,938,449 | A | | 7/1990 | Boeshart |
| D357,855 | S | | 5/1995 | Keith et al. |
| 5,519,973 | A | | 5/1996 | Keith et al. |
| 5,606,832 | A | | 3/1997 | Keith et al. |
| 5,671,574 | A | | 9/1997 | Long |
| 5,673,525 | A | | 10/1997 | Keith et al. |
| 5,809,723 | A | | 9/1998 | Keith et al. |
| 5,830,399 | A | | 11/1998 | Keith et al. |
| 5,987,830 | A | | 11/1999 | Worley |
| 5,987,834 | A | | 11/1999 | Keith et al. |
| 5,996,297 | A | | 12/1999 | Keith et al. |
| 6,079,176 | A | | 6/2000 | Westra |
| 6,088,985 | A | * | 7/2000 | Clark ...................... 52/309.11 |
| 6,112,491 | A | | 9/2000 | Keith et al. |
| 6,138,981 | A | | 10/2000 | Keith et al. |
| 6,148,576 | A | | 11/2000 | Janopaul |
| 6,272,805 | B1 | | 8/2001 | Ritter |
| 6,761,007 | B2 | * | 7/2004 | Lancelot et al. .............. 52/426 |
| 2003/0070379 | A1 | | 4/2003 | Worley |

* cited by examiner

*Primary Examiner*—Brian E. Glessner
(74) *Attorney, Agent, or Firm*—Workman Nydegger

(57) ABSTRACT

Connectors configured for providing composite wall structures with high composite action. In one embodiment, the connectors comprise a body having two spaced-apart sidewalls and a web portion extending therebetween, having a thickness that is less than the diameter or width of the sidewalls in the same dimension. The body also includes a tapered end comprising a single elongate edge or a plurality of spaced-apart edges or pointed ends at one end for facilitating penetration of the connector through layers of the composite wall during manufacture. An orienting protrusion orients the connector at a predetermined depth within the layers of the composite wall during manufacture. One or more structures anchoring anchor the connectors of the invention to layers of structural material placed on opposing sides of an insulation layer of the composite wall.

44 Claims, 8 Drawing Sheets

HIGH STRENGTH COMPOSITE WALL CONNECTORS HAVING TAPERED OR POINTED ENDS

CROSS-REFERENCE TO RELATED APPLICATIONS

The present application is a continuation-in-part of U.S. patent application Ser. No. 10/254,168, filed Sep. 25, 2002, now abandoned, entitled "High Strength Composite Wall Connectors Having a Tapered End," which is incorporated herein by reference in its entirety.

BACKGROUND OF THE INVENTION

1. The Field of the Invention

The present invention is in the field of composite wall structures and, more specifically, to the field of connectors used to secure together multiple layers of material within the composite wall structures.

2. The Relevant Technology

As new materials and compositions have been continuously developed, novel methods of synergistically combining apparently unrelated materials to form useful composites have also been developed. This is true of the area of building and construction in which high strength structural walls have been fabricated and then coated or layered with highly insulative materials having relatively low strength to provide a structure of both high strength and high insulation. In general, insulation is attached to the structural component. The outer wall structure is first erected. Then, an insulating material is placed on the inside of the outer wall structure, and an inner wall is placed over the insulating material to protect and hide it. The purpose of the insulation layer is to prevent, or at least slow, the transfer of thermal energy between the inner and outer walls.

A commonly used measurement of the thermal insulating qualities of a material is the mathematical coefficient "R" which is a measure of the thermal resistance of a material. The coefficient R is typically equal to the inverse of the coefficient "K" which is a measure of the thermal conductivity of the material. A "high R value" material or device is therefore understood by those in the art as possessing a high thermal resistance or insulating ability.

One of the least expensive and strongest building materials that has found extensive use in the construction industry is concrete, which is formed from a mixture comprising a hydraulic cement binder, water and a relatively low cost and high compressive strength aggregate material, such as rocks, pebbles and sand. Together these form a relatively high strength, low cost building material. Unfortunately, concrete has the drawback of offering poor insulation compared to highly insulating materials such as fiberglass or polymeric foam materials. While an 8 inch slab of concrete has an R value of 0.64, a 1 inch panel of polystyrene has an R value of 5.0. However, these latter materials, while highly insulative, also have the drawback of offering little or no structural strength or integrity.

Although structural walls made of cement or masonry can be fitted and even retrofitted with any number of insulating materials, including insulating mats or foams that are sprayed between an inner and outer wall, the insulation material is not able to impart the most efficient insulation possible due to the required structural bridging of the outer structural wall with the inner structural wall. Such structural bridging is necessary in order for the two-wall structure to have high strength and integrity and to prevent the two walls from collapsing together or separating apart during construction and subsequent use of the building. This has been accomplished through the use of metal studs, bolts, or beams. However, because metal is a very good conductive material (and therefore has very low insulating ability), such studs, bolts, beams, or other means for structurally bridging the two walls together also create a conductive thermal bridge across which heat can readily flow, notwithstanding their being surrounded by ample amounts of insulating material. As a result, heat can rapidly flow from a relatively warm inside wall to a colder outside wall during cold weather, for example. Therefore, although an insulating material may have a relatively high R value, the net R value of the composite wall structure can often be far less due to thermal bridging, thus negating or minimizing the effect of adding additional layers of insulation. Examples of U.S. Patents that disclose a composite wall structure held together using metal tie rods or studs include the following: U.S. Pat. No. 4,393,635 to Long, U.S. Pat. No. 4,329,821 to Long et al., U.S. Pat. No. 2,775,018 to McLaughlin, U.S. Pat. No. 2,645,929 to Jones, and U.S. Pat. No. 2,412,744 to Nelson.

In order to substantially overcome the problems of thermal bridging, some have employed the use of tie rods having a metal portion passing through the concrete layers and a thermally insulating portion passing through the insulating layer (e.g., U.S. Pat. No. 4,545,163 to Asselin). Yet others have developed highly insulative connector rods that are made entirely from high R-value materials in order to connect together the two concrete structural layers while minimizing the thermal bridging effect between the outer concrete layers. For example, U.S. Pat. No. 4,829,733 to Long (hereinafter the "Long '733 Patent)) discloses a plastic connector for forming an insulated wall having inner and outer concrete structural layers with highly insulating layers sandwiched therebetween. Although the plastic connector described in the Long '733 Patent has found some use in the construction industry, the connector described therein can be relatively expensive and difficult to manufacture due to the materials and processes required for forming the connector.

Another problem with the aforementioned connectors is that they do not provide adequate composite action. Composite action, which is well known by those skilled in the art, generally describes how well a multi-layered panel, or composite wall, transfers shear forces between its different layers and is typically identified as a percentage between 0% and 100%. A layered panel having a very high composite action will transfer shear forces very well and will behave like a single laminated panel. Whereas, a layered panel having a very low composite action will not transfer shear forces well and will behave more like a panel having a plurality of disconnected layers. Composite action can provide structural integrity to the wall. Accordingly, it is generally desirable to produce composite walls having high composite action so that they will remain intact when loads are applied to the wall. Existing connectors, however, have thus far proven inadequate for providing composite walls with the desired composite action.

Although Composite Technologies Corporation, the assignee of the Long '733 Patent, has made the claim that some of its connectors are able to provide 40% to 60% composite action, independent testing has shown that such connectors only provide about 10% composite action.

As generally described above, composite walls generally include an insulation layer sandwiched between a structural layer and a fascia layer. The structural layer is typically used as the load-bearing member of the wall. The fascia layer is typically not used to bear a load separated from the structural layer because of insufficient composite action existing between the facia layer and the structural layer. However, if the composite action of the wall was sufficiently high, e.g., between 60% to 100%, the fascia layer could potentially be used to bear a substantial portion of the overall load.

Accordingly, there is currently a need in the art for improved connectors that are simple to manufacture and that can be used to provide insulating composite walls with high composite action.

SUMMARY OF PRESENTLY PREFERRED EMBODIMENTS

The present invention is directed to improved connectors that are simple to manufacture and that can be used to provide high composite action to insulating composite walls.

According to one embodiment, the connectors of the invention include a body having two substantially parallel sidewalls and a web portion extending therebetween. In one embodiment, a cross-section of the body that includes the sidewalls and the web advantageously comprises the shape of an I, such that the web portion is advantageously generally perpendicular to the sidewalls. In other embodiments, the web portion may include internal ribs for additional strength.

The body is generally divided into three segments, which are designated as the penetrating, mesial and trail segments, respectively. The penetrating segment includes a tapered end extending between the two parallel sidewalls and is configured for facilitating penetration of the connector through an insulating layer and into a first layer of a hardenable structural material such as concrete. According to one embodiment, the tapered end includes a single elongate edge that extends between, and which is generally perpendicular to, the two parallel sidewalls. In other embodiments, the tapered end may be curved or include a plurality of tapered edges or points that are spaced apart so as to be discontinuous.

The trailing segment of the body may be configured as desired so as to, e.g., facilitate gripping and/or to receive a driving force sufficient for driving the penetrating segment through the insulating layer. The mesial segment of the body simply extends between the first and second segments and is configured so as to penetrate into and reside within an insulation layer.

The connectors of the invention may also include orienting means, nonmoveably affixed to the connector, for orienting the connector within the insulating layer at a predetermined depth. According to one embodiment, the orienting means may comprise at least one flange or other extension protruding laterally away from the body and located at or near the junction between the trailing segment and the mesial segment. The flange or other extension is configured to engage the insulating layer to inhibit the trailing segment from penetrating into the insulating layer during manufacture of the composite wall structure.

The connectors of the invention also advantageously include anchoring means configured so as to anchor the connector within the hardened structural layers. According to one embodiment, anchoring means are provided within the penetration segment for anchoring the penetrating segment within a first layer of hardened structural material. Anchoring means are also advantageously provided within the trailing segment for anchoring the trailing segment within a second layer of hardened structural material. The anchoring means may include any structure or combination of structures that facilitate anchoring of the connectors within hardened structural materials, including but not limited to, holes, depressions, ridges, notches, recesses, flanges, extensions, and other irregularities in the body of the connector.

The connectors of the invention are preferably formed from a highly insulative material, which results in highly insulative composite wall structures. For example, the connectors can be formed from thermoplastic or thermosetting plastic materials, such as high strength resins. Preferred materials include polyphenylsulfone resins, polypthalamides, polyamides, polyarylsulfones, polycarbonates, polypthalamides, polysulfones, polyphthenyl sulfones, polyether sulfones and aliphatic polyketones. Less preferred materials that are nevertheless adequate for many applications include acrylics, polyethylene, polypropylene, acrylonitrile-butadiene-styrene copolymers, polyfluorocarbons, polybutadienes, polybutylene terapthalates, polyesters, polyethylene terephthalates, polyphthenelyne ethers, polyphthenelyne oxides, polyphthenyline sulfides, polyphthalate carbonates, polypropylenes, polystyrenes, polyurethanes, polyvinyl chlorites, and polyxylenes. Preferred thermoset resins include polyester and vinyl esters. Other suitable thermoset materials include dialoyl phthalates, epoxy resins, furan resins and phenolic resins. In addition, copolymers and blends of the foregoing materials may be used.

The criteria used to select an appropriate material include concerns for strength, flexibility, insulation ability, cost and moldability. In general, thermoplastics and thermosetting plastics provide the advantages of low cost, low weight and ease of manufacturing.

During manufacture of an insulating composite wall, an insulating layer is placed over a first layer of a hardenable structural material. The connectors of the invention are partially forced through the insulating layer so that at least a portion of the first segment of the connectors is inserted into the hardenable structural material. The tapered end on the connectors facilitates their insertion through the insulation and unhardened structural material. To further facilitate insertion of the connectors, slots or holes can be formed into the insulation layer where the connectors are to be inserted. A flange or other stop at or near the interface between the mesial and trailing segments on the connectors orient the connectors at a predetermined depth within the insulation layer and keep the connector from passing completely through the insulation layer. A second layer of hardenable structural material is placed over the insulation layer, enveloping at least a portion of the second segment of the connectors. Once the hardenable structural material hardens, anchoring means on the connectors secure the connectors in place, respectively within the first and second layers, thereby holding the composite wall together. The connectors provide the assembled composite wall with about 50% to about 100% composite action, preferably at least about 60% composite action, more preferably at least about 70% composite action, more especially preferably at least about 80% composite action, and most preferably at least about 90% composite action.

The amount of composite action that is imparted by the connectors is also related to their spacing. All things being equal, connectors that are closer together will yield a composite wall structure having greater composite action, while connectors that are farther apart will yield a composite wall structure having less composite action. Thus, actual composite action can range anywhere between about 15% to about 100%. Depending on how much composite action is desired, it will be possible, based on the teachings described herein, to select a spacing pattern that will provide the desired level of composite action. One of ordinary skill in the art will be able to, based on the strength and composite action of the connectors, the strength and thickness of the structural layers, the strength and thickness of the insulating layer, and other factors that may be determined to affect overall composite wall action, design a spacing patter will provide the desire composite action.

These and other benefits, advantages and features of the present invention will become more fully apparent from the following description and appended claims, or may be learned by the practice of the invention as set forth hereinafter.

BRIEF DESCRIPTION OF THE DRAWINGS

In order that the manner in which the above recited and other benefits, advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
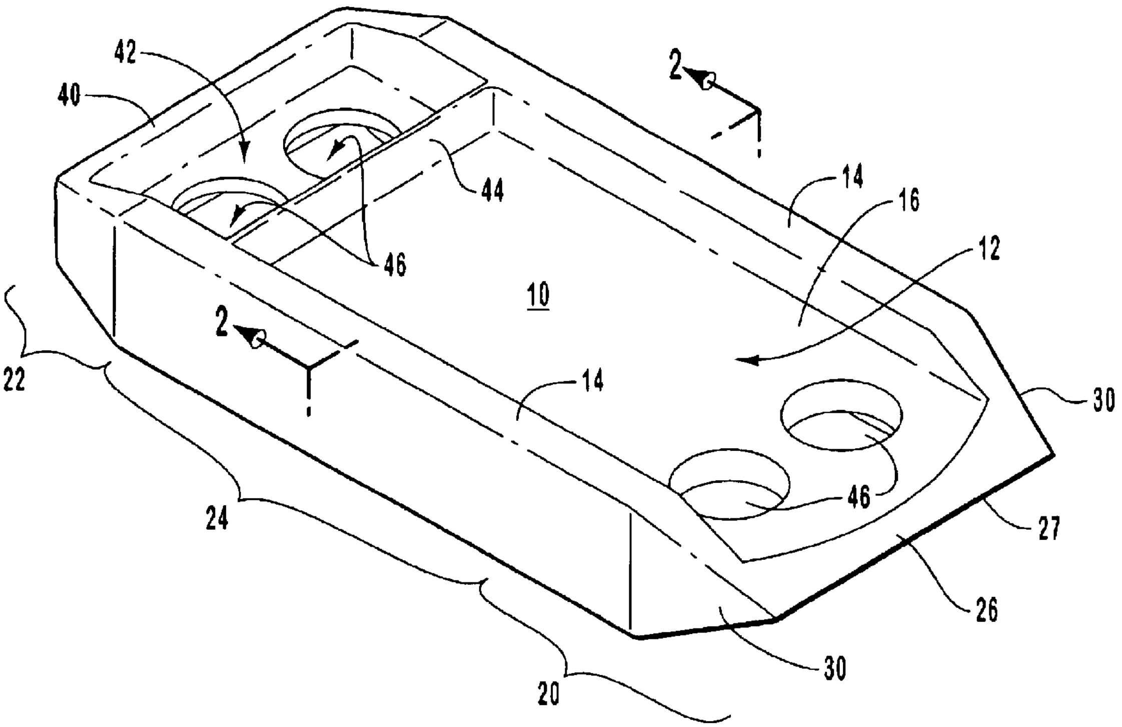
FIG. 1 illustrates a perspective view of one embodiment of the connector of the invention that includes a body having two parallel sidewalls, a web portion extending between the sidewalls, a first segment configured with a tapered end, a second segment configured with a non-tapered end, and a mesial segment extending between the first and second segments.

A detailed description of the connectors of the invention will now be provided with specific reference to figures illustrating various embodiments of the invention. It will be appreciated that like structures will be provided with like reference designations.

The embodiments of the present invention are generally directed to improved connectors used for the manufacture of insulating composite walls that include an insulation layer sandwiched between two layers of hardenable structural material. The connectors are specifically configured to secure the two layers of structural material against the insulation layer and to provide the resultant composite wall with from about 50% to 100% composite action.

The term "composite action," which is well known in the art, generally refers to the ability of the composite wall to act like a single laminated wall rather than like a wall having a plurality of disconnected layers. The following equation is used by the concrete industry (PreCast/Prestressed Concrete Institute (PCI)) to define composite action as a percentage, within a range of 0% to 100%: $k=(I_{exp}-I_{nc})/(I_c-I_{nc})$, wherein $I_{exp}$ is the experimentally determined moment of inertia of the test wall and $I_{nc}$ and $I_c$ are the respective theoretical values of the moments of inertia of the fully composite wall and of the noncomposite wall.

The term "hardenable structural material" refers to a material that is configured to change from an unhardened state, in which the material is generally characterized as uncured, deformable, or fluid, to a hardened state, in which the material is generally characterized as cured, or solid. One nonlimiting example of a hardenable structural material includes concrete material including a hydraulic cement binder, water, an aggregate material and other appropriate admixtures. Plasters, mortars, plastics, and resins may also comprise hardenable structural material. The term "hardenable structural material" is sometimes used herein interchangeably with the term "structural material."

The term "insulating composite wall," as used herein, generally refers to a wall or layered structure that includes an insulation layer disposed between two layers of hardenable structural material. Although the insulating composite wall generally consists of only three layers, each of these layers may also include a plurality of layers.

The terms "tapered end" and "pointed end" as used herein, refers to a portion of the connector having a progressively smaller thickness toward an end thereof. The tapered end may be sharp or blunt as desired.

The connectors of the invention are preferably injection molded from any appropriate resin or other high strength plastic material, although they may also be molded by resin transfer molding, reaction injection molding, or any other single step or relatively simple molding process known in the art. It is also within the scope of the invention to utilize multi-step manufacturing processes, such as those that employ assembly and/or machining steps.

A preferred resinous material is polycarbonate resin because of the ease in which it may be injection molded. Other similar resinous materials include polyphthalamide (PPA) and polycarbonate-polybutylene terephthalate alloy, which are generally less expensive than polycarbonate resins. Other resins that may be used to manufacture the connectors of the invention include, but are not limited to, epoxy resins, thermoset plastics, and other high strength, high R-value materials may be used. The high R value generally minimizes the transfer of heat between the two layers of the structural material in the composite wall that occurs through the connectors.

Although not necessary in many instances, it may be desirable to incorporate within the resinous material or other plastic material fibers such as glass fibers, carbon fibers, boron fibers, ceramic fibers, and the like in order to increase the tensile strength, bending strength, shear strength and toughness of the connectors.

Attention is now directed to FIG. 1, which illustrates a perspective view of one embodiment of the connector of the invention. As shown, the connector 10 includes a body 12 having two sidewalls 14 and a web portion 16 that extends between the sidewalls 14. The body 12 of the connector 10 is generally divided into three segments, including a penetrating segment 20, a trailing segment 22, and a mesial segment 24.

Figure 3:
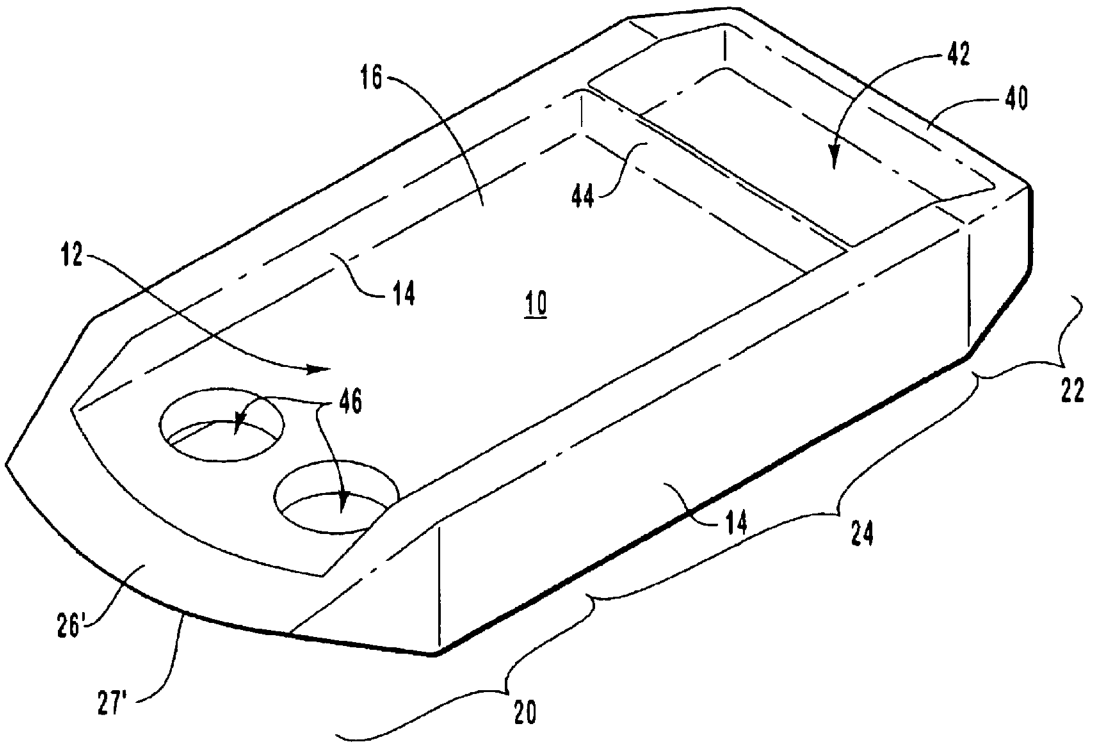
FIG. 3 illustrates a perspective view of one embodiment of the connector of the invention that includes a curved tapered end.
Figure 5:
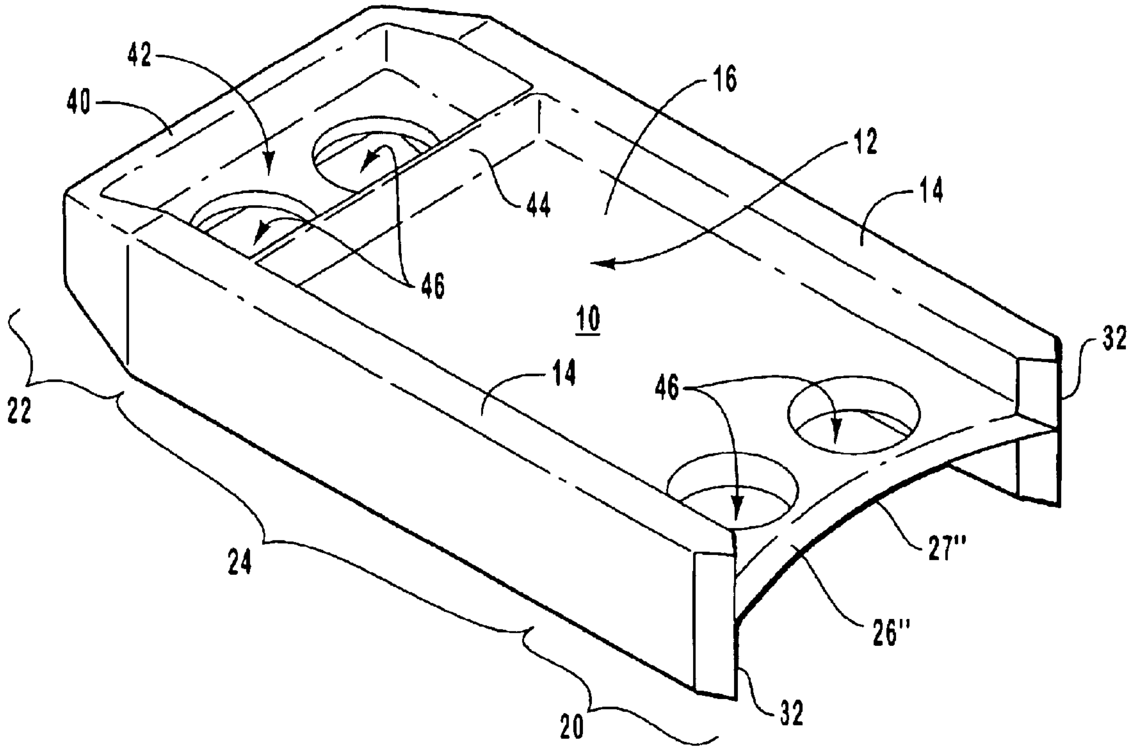
FIG. 5 illustrates a perspective view of one embodiment of the connector of the invention that includes sidewalls that terminate into chisel-like ends that are perpendicular to the main tapered end.
Figure 6:
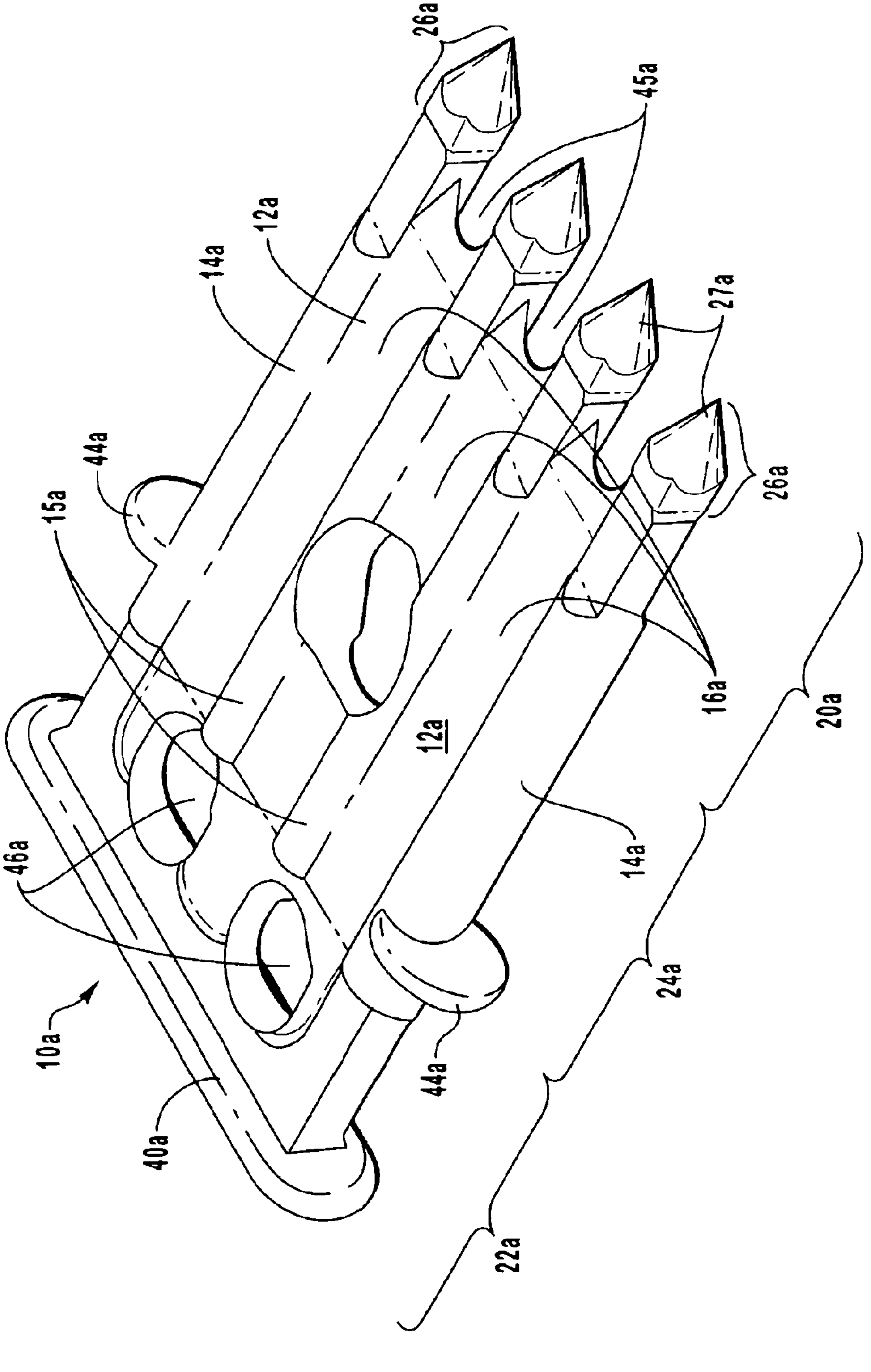
FIGS. 6 and 7 illustrate a perspective view of an alternative embodiment of the connector of the invention.
Figure 7:
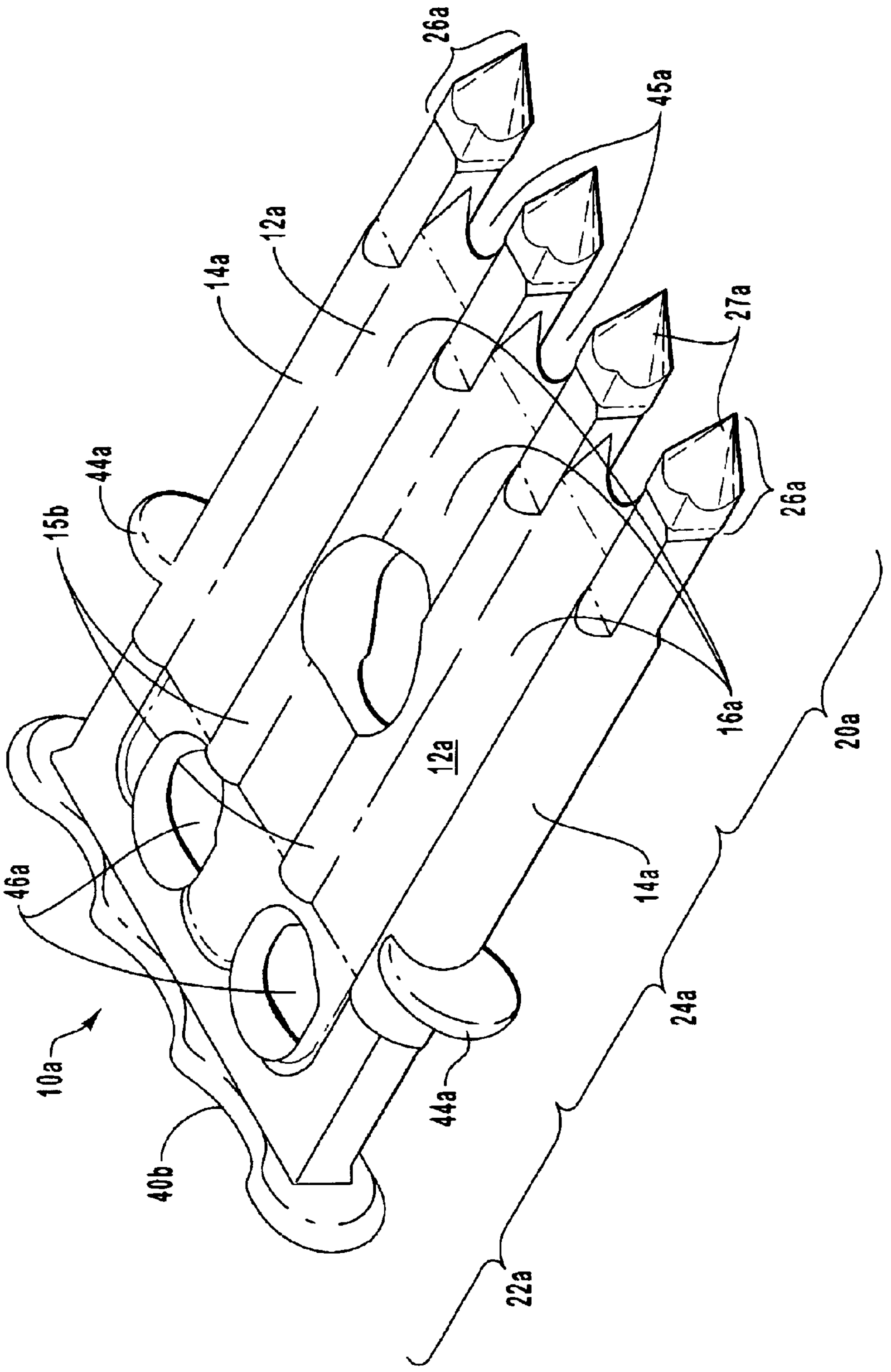

As shown, the penetrating segment 20 includes a tapered end 26 that extends between the two sidewalls 14. According to one embodiment, the sidewalls 14 are parallel and the tapered end 26 comprises a straight elongate edge 27 perpendicularly extending between the sidewalls 14. The tapered end 26 is specifically configured for being inserted through an insulation layer and into a layer of hardenable structural material during the manufacture of a corresponding composite wall, as described in more detail below in reference to FIG. 8A. Although the tapered end 26 of the connector 10 is shown to comprise a straight elongate edge 27, it will be appreciated that, according to other embodiments, the tapered end 26 may comprise other shapes. For instance, the tapered end may be curved convexly, curved concavely, pointed convexly, pointed concavely, etc., to further facilitate the insertion of the connector through the insulation layer of the composite wall. The elongate edge 27 may be sharp or blunt as desired. FIG. 3 illustrates an embodiment in which a tapered end 26' is curved convexly so as to have a convex elongate edge 27'. FIG. 5 illustrates an embodiment in which the tapered end 26" is curved concavely so as to have a concave elongate edge 27". FIGS. 6 and 7 illustrate an embodiment in which a tapered end 26*a* includes a plurality of spaced-apart points 27*a*.

Figure 2:
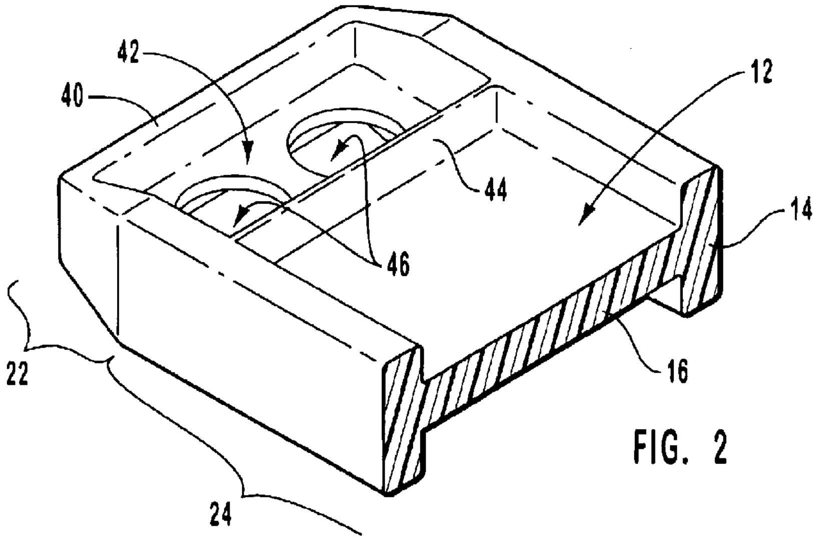
FIG. 2 illustrates a cross-sectional perspective view of the connector of FIG. 1 that shows a cross-sectional area of the sidewalls and the web portion of the connector in the mesial segment along cross-sectional line 2—2 of FIG. 1.

FIG. 2 illustrates a cross-sectional area of the connector 10 taken along line 2-2 of FIG. 1. As shown in FIG. 2, the cross-section of the sidewalls 14 and the web portion 16 taken through the mesial segment 24 of the body 12 generally comprises the shape of an I. It will be appreciated that this shape generally provides the connector with a high moment of inertia that is conducive to providing a high composite action. According to one preferred embodiment, the distance between the sidewalls 14, corresponding with the width of the web portion 16, is within the range of about 2 inches and about 3 inches. The width of the sidewalls 14 is preferably within the range of about ⅛ to about ½ of an inch. The width of the sidewalls 14 is preferably at least 50% greater than the thickness of the web portion 16 in the same dimension, more preferably at least twice the thickness of the web portion 16, and most preferably at least three times the thickness of the web portion 16.

Although the sidewalls 14 are shown to be generally rectilinear, it will be appreciated that the sidewalls 14 may also comprise other shapes. For instance, the sidewalls may be square, oval, circular, triangular, hexagonal, etc., while still providing the connector 10 with a high moment of inertia. It will also be appreciated that although the web portion 16 is shown to extend substantially planarly and perpendicularly between the sidewalls 14, the web portion 16 may also be configured according to alternative embodiments to extend between the sidewalls 14 along an irregular or curved trajectory.

As shown in FIG. 1, the sidewalls 14 generally terminate within the first segment 20 into corresponding angles faces 30 that are disposed on opposing ends of the tapered end 26. This angled configuration is particularly suitable for facilitating the insertion of the connector 10 through the insulation layer of a composite wall. It will be appreciated, however, that the sidewalls 14 may also terminate in the tapered end 26 with different configurations. For instance, according to the embodiment shown in FIG. 5, the sidewalls 14 terminate into chisel-like edges 32 disposed on opposing ends of the tapered end 26". This embodiment may be useful for increasing the structural stability to the connector 10 near the tapered end 26", while still facilitating insertion of the connection 10 within an insulation layer. According to another embodiment, the sidewalls 14 may be configured to gradually taper from the second segment 22 to the tapered edge rather than tapering only in the first segment 22 as shown.

Returning now to FIG. 1, it is shown how the connectors 10 of the invention may include a trailing wall 40 that extends at least partially between the sidewalls 14 within the trailing segment 22. It will be appreciated that the wall 40 may comprise any desired shape according to the invention. One use of the wall is for gripping the connector 10. The wall 40 can also be used for receiving a driving force sufficient for driving the connector 10 through the insulating layer of a composite wall, as described below in more detail. Yet another function of the wall 40 is to provide an anchoring means for anchoring the second segment within a layer of structural material. For instance, the protrusion of the wall 40 may be used as an anchoring means for anchoring the connector 10 within a layer of structural material during the manufacture of a composite wall, as described below.

According to one preferred embodiment, the connectors 10 of the invention comprise anchoring means for anchoring the connectors 10 within the layers of the composite wall. Anchoring means may comprise any suitable recess, hole, ridge, protrusion, depression, flange, wall, extension, irregularity, or other formation that can be used to anchor the connector 10 into the structural material of a composite wall. During the manufacture of a composite wall, structural material flows into or around the anchoring means where it subsequently hardens. Once hardened, the structural material securely engages the anchoring means, thereby securing the connector in a desired placement within the layers of the structural material.

As shown in FIGS. 1–3, the recess 42 defined by the boundaries of the sidewalls 14, the trailing wall 40, and the flange 44 may comprise suitable anchoring means within the trailing segment 22. In particular, structural material flows into and hardens within the recess 42 during the manufacture of the composite wall, thereby anchoring the connector 10 within a desired placement. Hole formations 46, shown in FIGS. 1–3 and 5–8B comprise an anchoring means in both the penetrating and trailing segments.

Figure 4:
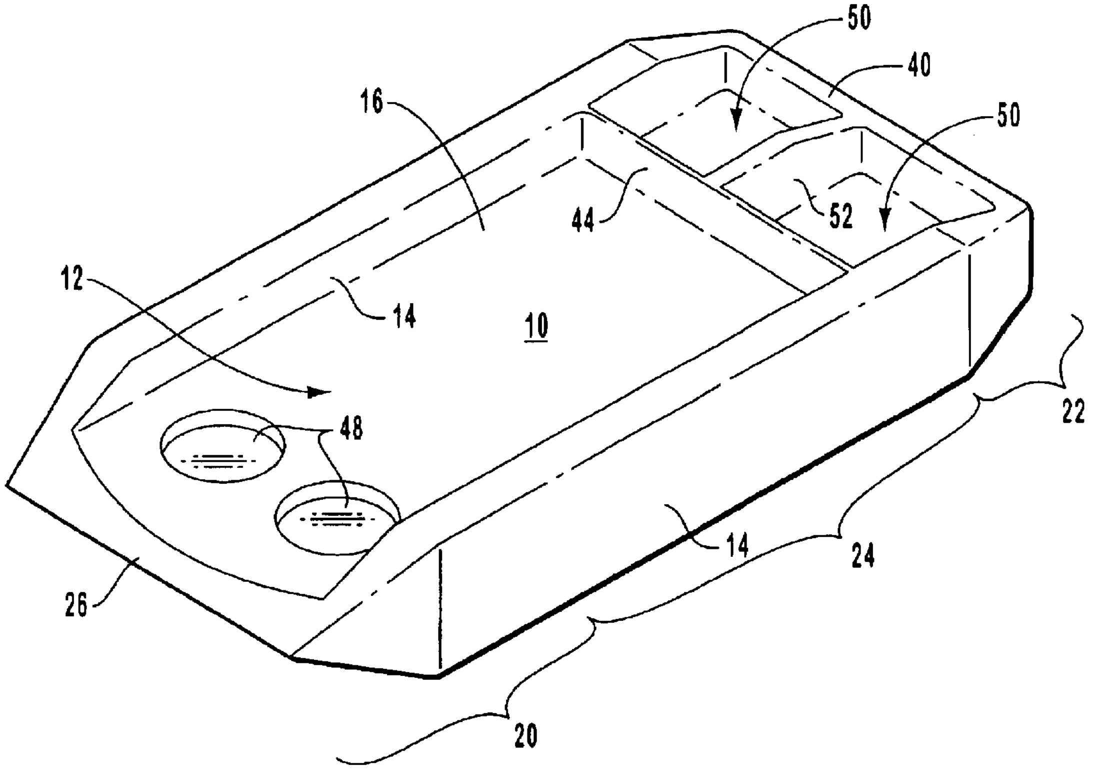
FIG. 4 illustrates a perspective view of one embodiment of the connector of the invention that includes anchoring means comprising recesses formed in the first and second segments of the connector.

As shown in FIG. 4, anchoring means may also include recesses 48, such as those illustrated in the first penetrating segment 20, or large recesses 50 formed in the trailing segment 22. The large recesses 50 formed in the second segment 22 are generally defined by the boundaries of the sidewalls 14, the trailing wall 40, the flange 44, and a divider 52.

According to one embodiment, the connectors of the invention also include orienting means for, orienting the connectors within the insulating layer of a composite wall and at a predetermined depth. According to the embodiments shown in FIGS. 1–5 and 8A–8B, the orienting means may include a flange 44 nonmoveably affixed to and protruding away from the web portion 16 between the second segment 22 and the mesial segment 24. The flange is specifically configured to engage the insulating layer of a composite wall to prevent the second segment 22 from passing through the insulating layer. The flange 44 may extend partially or wholly between sidewalls 14.

Additional embodiments of connectors according to the invention are shown in FIGS. 6 and 7. As shown, the connector 10*a* includes a body 12*a* having two sidewalls 14*a*, at least a portion of each sidewall having a circular cross section, and a recessed web portion 16*a* that extends between the two sidewalls 14*a*. In the embodiments illustrated in FIGS. 6 and 7, the body 12*a* further includes raised longitudinal ribs 15*a* extending from the surfaces of the web portion 16*a*. The body 12*a* of the connector 10*a* is generally divided into three segments, including a penetrating segment 20*a*, a trailing segment 22*a*, and a mesial segment 24*a*.

As shown, the penetrating segment 20*a* includes a tapered end 26*a* comprising a plurality of pointed tips 27*a*. The pointed tips 27*a* are specifically configured for being inserted through an insulation layer and into a layer of hardenable structural material during the manufacture of a composite wall structure, as described in more detail below in reference to FIGS. 10A and 10B. It will be appreciated that instead of pointed tips 27*a*, the tapered end 26*a* may include a plurality of spaced-apart chisel-like edges (not shown) as an intermediate variation between the pointed tips 27*a* of FIGS. 6 and 7 and the elongate edges 27, 27', 27" of FIGS. 1, 3, 4 and 5.

Although the sidewalls 14*a* are shown with a portion having a generally circular cross section, it will be appreciated that the sidewalls 14*a* may also comprise other shapes. For instance, the sidewalls may incorporate cross sections being square, oval, triangular, hexagonal, etc., while still providing the connector 10*a* with a high moment of inertia.

As in the embodiments shown in FIGS. 1–5, the web portion 16*a*, when viewed exclusive of the raised longitudinal ribs 15*a*, has a thickness that is less than the width or diameter of sidewalls 14*a* in the same dimension. The width or diameter of the sidewalls 14*a* is preferably at least 50% greater than the thickness of the web portion 16*a* (i.e., exclusive of the raised longitudinal ribs 15*a* in the same dimension, more preferably at least twice the thickness of the web portion 16*a*, and most preferably at least three times the thickness of the web portion 16*a*.

As shown in FIGS. 6 and 7, the sidewalls 14*a* and raised longitudinal ribs 15*a* generally terminate within the first segment 20*a* into corresponding pointed tips 27*a*. This configuration of pointed tips 27*a* is particularly suitable for facilitating the insertion of the connector 10*a* through the insulation layer of a composite wall. The connectors 10*a* of the invention may include a trailing wall 40*a* that extends at least partially between the sidewalls 14*a* within the trailing segment 22*a*. It will be appreciated that the wall 40*a* may comprise any desired shape according to the invention. FIG. 6 shows a trailing wall 40*a* that is generally rectilinear with rounded edges and corners, while FIG. 7 shows a trailing wall 40*b* that includes recessed portions along its length to facilitate gripping by a user. One use of the wall is for gripping the connector 10*a*. The wall 40*a*, 40*b* can also be used for receiving a driving force sufficient for driving the connector 10*a* through the insulating layer of a composite wall. Yet another function of the wall 40*a*, 40*b* is to provide an anchoring means for anchoring the second segment within a layer of structural material. For instance, the protrusion of the wall 40*a*, 40*b* may be used as an anchoring means for anchoring the connector 10*a* within a layer of structural material during the manufacture of a composite wall, as described below.

According to one preferred embodiment, the connectors 10*a* of the invention comprise anchoring means for anchoring the connectors 10*a* within the layers of the composite wall. Anchoring means may comprise any suitable recess, hole, ridge, protrusion, depression, flange, wall, extension, irregularity, or other formation that can be used to anchor the connector 10*a* into the structural material of a composite wall. During the manufacture of a composite wall, structural material flows into or around the anchoring means where it subsequently hardens. Once hardened, the structural material securely engages the anchoring means, thereby securing the connector in a desired placement within the layers of the structural material. Hole formations 46*a* comprise an anchoring means in trailing segment 22*a*.

According to one embodiment, the connectors illustrated in FIGS. 6 and 7 include orienting means for orienting the connectors within the insulating layer of a composite wall and at a predetermined depth. The orienting means may include a flange 44*a* nonmoveably affixed to and protruding away from the sidewalls 14*a* at the intersection of the second segment 22*a* and the mesial segment 24*a*. The flange 44*a* is specifically configured to engage the insulating layer of a composite wall to prevent the second segment 22*a* from passing through the insulating layer.

The connector embodiments illustrated in FIGS. 6 and 7 also may include one or more recesses 45*a* formed between pointed tips 27*a*. Recesses 45*a* allow reinforcement (e.g. rebar) that may be present in the first structural layer to be inserted into the recesses 45*a* between the pointed tips 26*a*. In addition recesses 45*a* may increase the composite action of the connector.

Figure 8A:
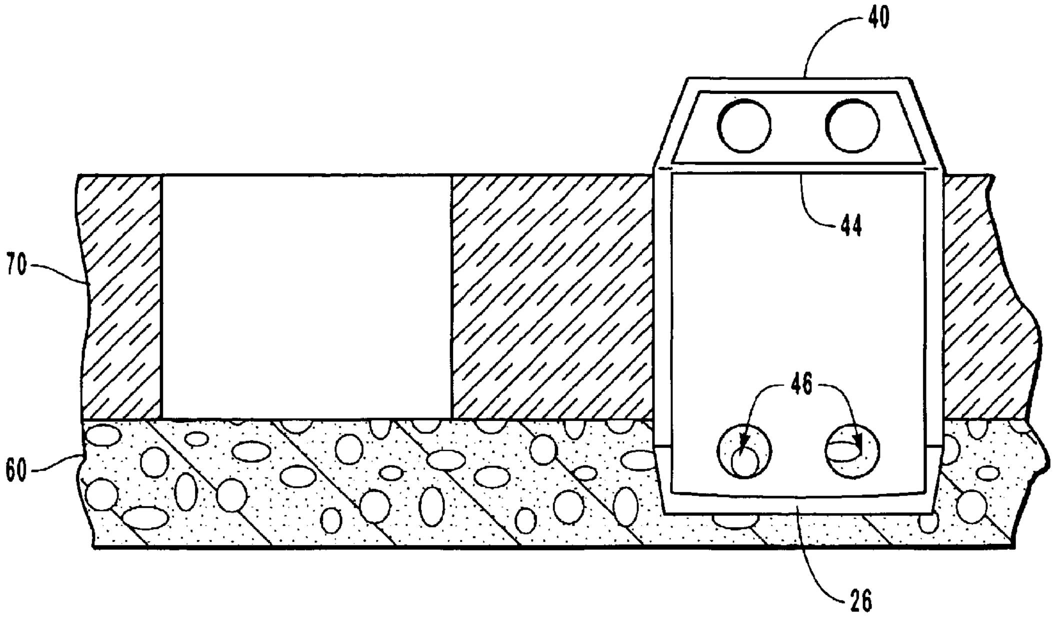
FIG. 8A illustrates a front elevational cross-section view of a partially completed composite wall structure.
Figure 8B:
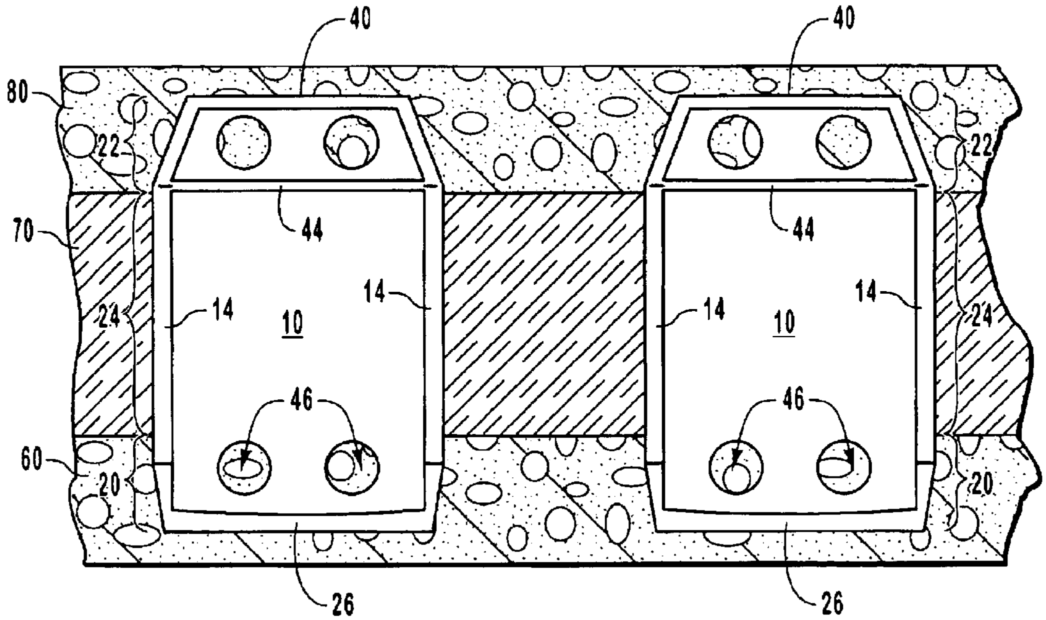
FIG. 8B illustrates a front elevational cross-section view of a completed composite wall structure.

Turning now to FIGS. 8A and 8B, it is shown how the connectors 10 can be used to manufacture a composite wall. The use of connectors 10*a* will be described in detail hereinafter, with reference to FIGS. 10A and 10B. In a preferred method for manufacturing composite wall structures, a first layer 60 of a structural material is poured into an appropriate form (not shown). In general, the first structural layer will be a rectangular slab, although it may also include other design, ornamental or structural features. The only limitation is that it have a thickness or depth great enough to give the first structural layer 60 adequate strength and the ability to firmly anchor the penetrating segment 20 of the connector 10 therein.

Figure 9A:
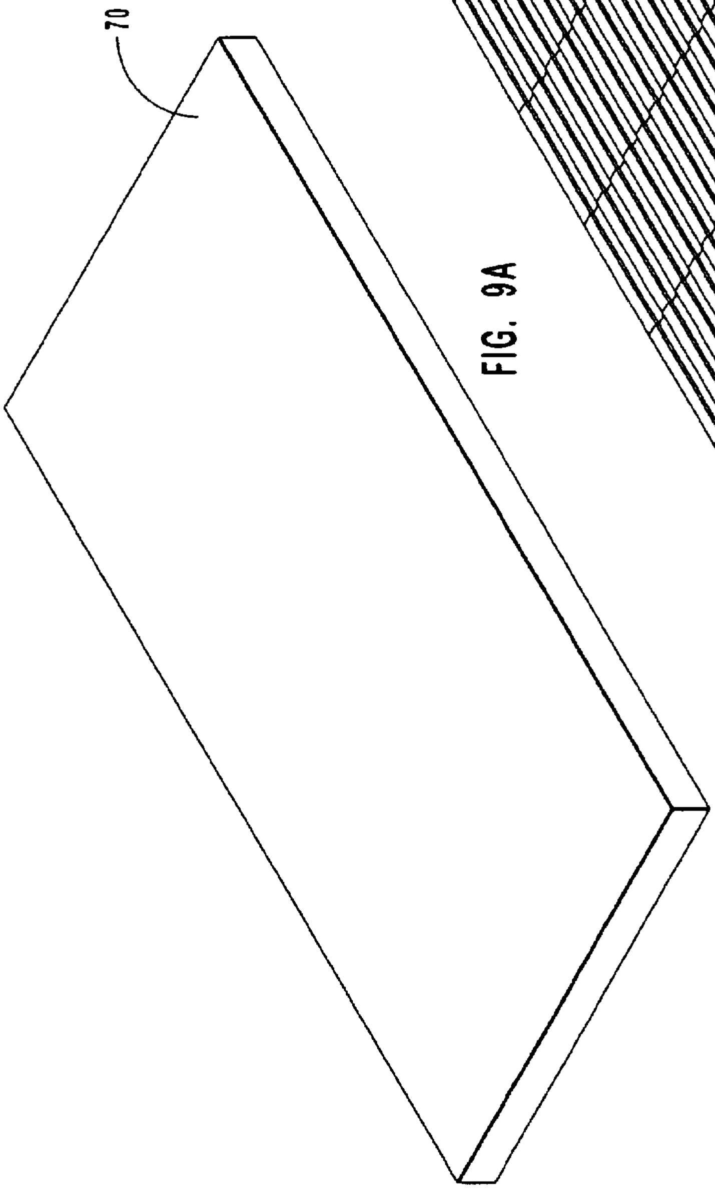
FIGS. 9A and 9B illustrate alternative insulating layers that may be used in a composite wall structure.
Figure 9B:
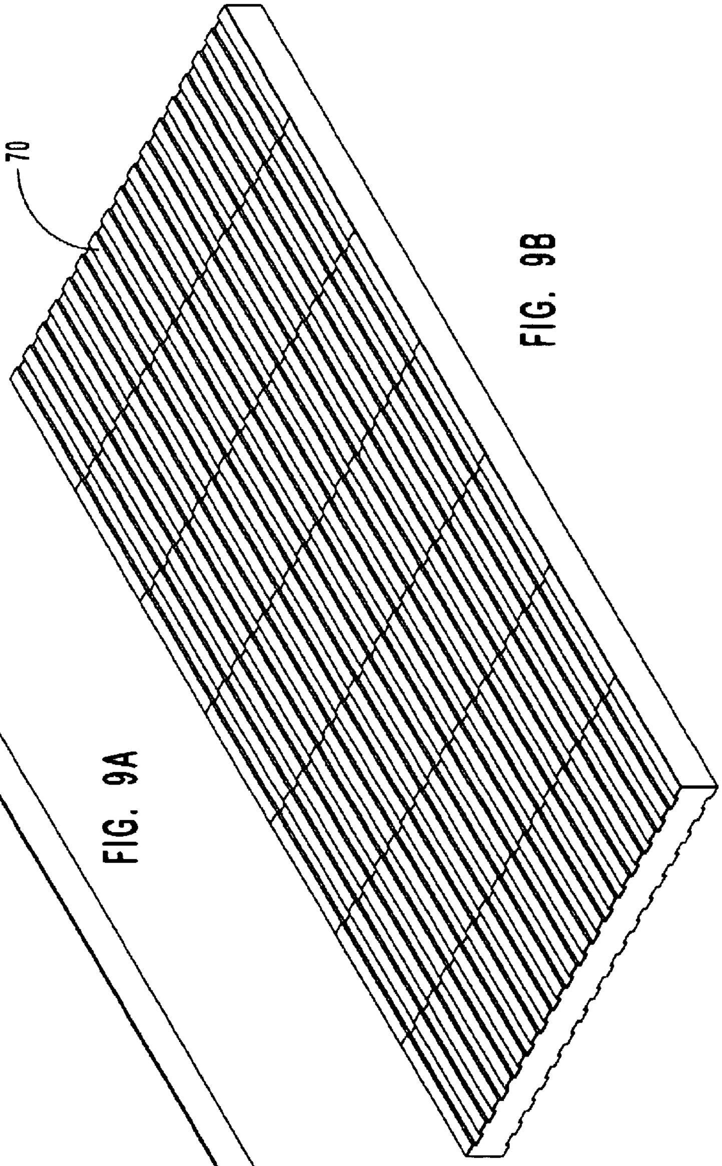

Before the first structural layer 60 obtains such rigidity that a connector 10 cannot be inserted therein without damaging the ultimate structural integrity and strength of the first structural layer 60, an insulating layer 70 is placed adjacent to the exposed side of the first structural layer 60. The insulating layer 70 may, although not necessarily, include a plurality of holes or slots through which the connectors of the invention will be inserted. In addition, the insulating layer may be substantially smooth (FIG. 9A), or alternatively, it may include grooves formed along its surface, as illustrated in FIG. 9B. Using a grooved insulating layer may improve the composite action of the composite wall, as it allows unhardened structural material of the structural layers to flow into and around the grooves of the insulating layer 70, thereby mechanically locking the structural and insulation layers together.

The connector 10 is then pushed or driven through the insulation layer 70 and into the first structural layer 60 while the structural material is still unhardened. The tapered end 26 on the connector 10 is configured to facilitate passage of the connector 10 through any preformed holes or to cut through the insulation when there are not any preformed holes in the insulation layer, thereby facilitating the insertion of the connector 10 in either event. In order to insert the connector 10 to a desired depth, it may be necessary to apply a driving force to the wall 40 of the connector 10. This driving force may be applied by hand or with a tool, such as a hammer or mallet. The connector 10 is inserted to the insulation layer 70 until the flange 44 protruding away from the web portion 16 engages against the insulation layer 70, thereby indicating the desired depth has been reached. Accordingly, the flange 44 comprises one suitable means for orienting the connector 10 within the insulation layer 70 at a predetermined depth.

Once the connector 10 is properly oriented within the insulation layer 70, the structural material of the first structural layer 60 flows into and engages hole formations 46 or other anchoring means of the first segment 20 of the connector 10. Vibration of the first layer and/or movement of the connector 10 may be necessary to ensure adequate engagement of the penetrating segment 20 with the structural material. Once the structural material cures then the connector 10 is effectively anchored within the first structural layer 60.

After the first structural layer 60 has achieved an adequate level of hardness or strength, a second layer of structural material is poured over the surface of the insulating layer 70 to form the second structural layer 80, as shown in FIG. 8B. The depth of the second structural layer 80 should be such that is completely, or at least substantially, engulfs the head 40 of the connector and engages any anchoring means formed in the second segment 22 of the connector 10, thereby providing an adequate anchoring effect of the connector 10 within the second structural layer 22. The flange 44 also aids in preventing the hardened second structural layer 80 from collapsing against the first structural layer 60 when hardened and tilted up or otherwise positioned for use.

Figure 10A:
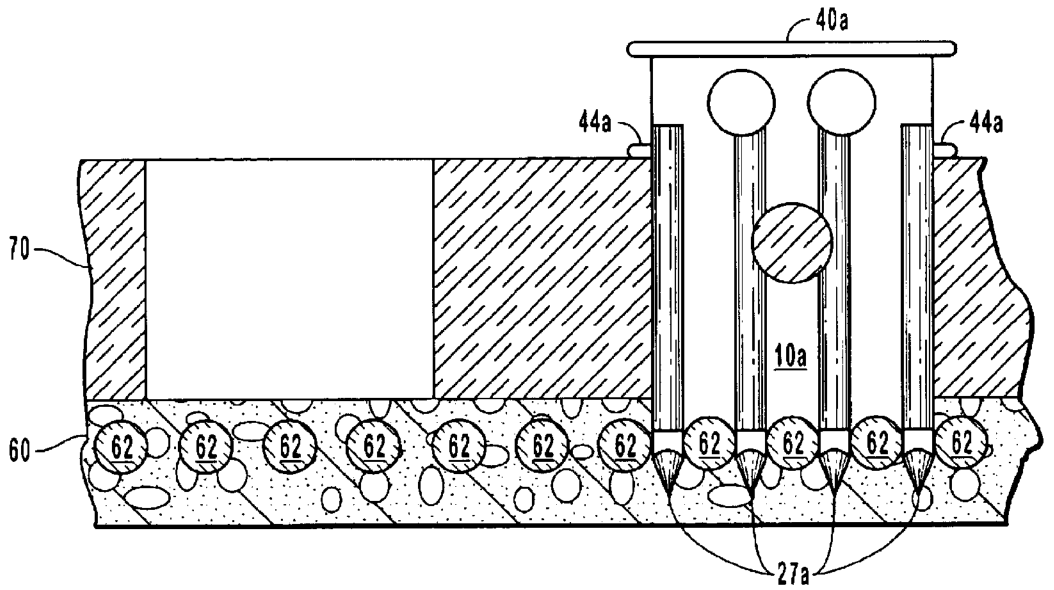
FIG. 10A illustrates a front elevational cross-section view of a partially completed composite wall structure incorporating the connectors illustrated in FIGS. 6 and 7.
Figure 10B:
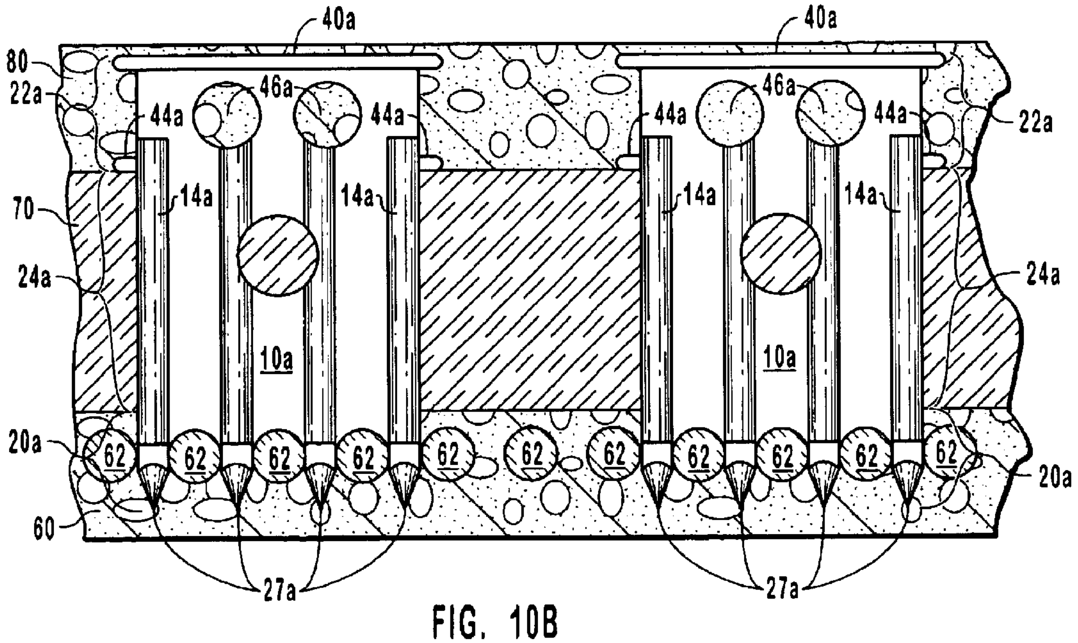
FIG. 10B illustrates a front elevational cross-section view of a completed composite wall structure incorporating the connectors illustrated in FIGS. 6 and 7.

FIGS. 10A and 10B illustrate a preferred method for manufacturing composite wall structures using connectors 10*a* of FIGS. 6 and 7. A first layer 60 of a structural material is poured into an appropriate form (not shown). In general, the first structural layer will be a rectangular slab, although it may also include other design, ornamental or structural features. The only limitation is that it have a thickness or depth great enough to give the first structural layer 60 adequate strength and the ability to firmly anchor the penetrating segment 20*a* of the connector 10*a* therein.

Before the first structural layer 60 obtains such rigidity that a connector 10*a* cannot be inserted therein without damaging the ultimate structural integrity and strength of the first structural layer 60, an insulating layer 70 is placed adjacent to the exposed side of the first structural layer 60. The insulating layer 70 may, although not necessarily, include a plurality of holes or slots through which the connectors of the invention will be inserted. In addition, the insulating layer may be substantially smooth (FIG. 9A), or alternatively, it may include grooves formed along its surface, as illustrated in FIG. 9B. Using a grooved insulating layer may improve the composite action of the composite wall, as it allows unhardened structural material of the structural layers to flow into and around the grooves of the insulating layer 70.

The connector 10*a* is then pushed or driven through the insulation layer 70 and into the first structural layer 60 while the structural material is still unhardened. The pointed tips 27*a* on the connector 10*a* are configured to facilitate passage of the connector 10*a* through any preformed holes or to cut through the insulation when there are not any preformed holes in the insulation layer, thereby facilitating the insertion of the connector 10*a* in either event. In order to insert the connector 10*a* to a desired depth, it may be necessary to apply a driving force to the wall 40*a*, 40*b* of the connector 10*a*. This driving force may be applied by hand or with a tool, such as a hammer or mallet. The connector 10*a* is inserted through the insulation layer 70 until the flanges 44*a* protruding away from the circular sidewalls 14*a* engage against the insulation layer 70, thereby indicating the desired depth has been reached. Accordingly, the flanges 44*a* comprise one suitable means for orienting the connector 10*a* within the insulation layer 70 at a predetermined depth.

As the connector 10*a* is inserted through the insulation layer 70, the recesses 45*a* between the pointed tips 27*a* may receive rebar 62 or other reinforcement that may be present in first structural layer 60.

Once the connector 10*a* is properly oriented within the insulation layer 70, the structural material of the first structural layer 60 flows into and engages around pointed ends 26*a*, recesses 45*a*, a portion of sidewalls 14*a*, and ribs 14*b* of the first segment 20*a* of the connector 10*a*. These and other structures may comprise anchoring means of the connector 10*a*. Vibration of the first layer and/or movement of the connector 10*a* may be necessary to ensure adequate engagement of the penetrating segment 20*a* with the structural material. In addition, vibration and/or movement may assist in engaging rebar 62 or other reinforcement within recesses 45*a*. Once the structural material cures then the connector 10*a* is effectively anchored within the first structural layer 60.

After the first structural layer 60 has achieved an adequate level of hardness or strength, a second layer of structural material is poured over the surface of the insulating layer 70 to form the second structural layer 80, as shown in FIG. 10B. The depth of the second structural layer 80 should be such that it completely, or at least substantially, engulfs the head 40*a*, 40*b* of the connector and engages holes 46*a* or other anchoring means formed in the second segment 22*a* of the connector 10*a*, thereby providing an adequate anchoring effect of the connector 10*a* within the second structural layer 80. The flange 44*a* also aids in preventing the hardened second structural layer 80 from collapsing against the first structural layer 60 when hardened and tilted up or otherwise positioned for use.

With either configuration illustrated in FIGS. 8A and 8B or 10A and 10B, it may be desirable to lay a second insulating layer over the yet unhardened second structural layer 80, followed by the insertion of additional connectors through the second insulation layer and second structural layer. Thereafter, a third structural layer will be cast over the surface of the second insulating layer as before. Because of the simplicity of molding the connectors of the present invention, an adapted connector could be molded that would connect three or more structural layers together. Alternatively, the three or more structural layers can be held together using overlapping connectors of the type shown in FIGS. 1–10B.

It has been found that the connectors of the invention are capable of providing an assembled composite wall with about 50% to about 100% composite action. It will be appreciated that this is a significant improvement over prior art connectors that have been found, according to independent testing, to provide only 10% composite action. One benefit of providing such superior composite action is that is enables loads to be independently carried by each of the structural layers. It will be appreciated that this is not possible when the composite action is small, such as when using the connectors of the prior art, because the shear forces caused by the independent loads could cause the structural layers to break away from the composite wall.

The connectors according to the invention preferably provide at least about 60% composite action, more preferably at least about 70% composite action, more especially preferably at least about 80% composite action, and most preferably at least about 90% composite action.

The amount of composite action that is imparted by the connectors is also related to their spacing. All things being equal, connectors that are closer together will yield a composite wall structure having greater composite action, while connectors that are farther apart will yield a composite wall structure having less composite action. Thus, actual composite action can range anywhere between about 15% to about 100%. Depending on how much composite action is desired, it will be possible, based on the teachings described herein, to select a spacing pattern that will provide the desired level of composite action. One of ordinary skill in the art will be able to, based on the strength and composite action of the connectors, the strength and thickness of the structural layers, the strength and thickness of the insulating layer, and other factors that may be determined to affect overall composite wall action, design a spacing patter will provide the desire composite action.

Although specific embodiments of the invention have been illustrated and described herein, it will be appreciated that the present claimed invention may be embodied in other specific forms without departing from its spirit or essential characteristics. The described embodiments are to be considered in all respects only as illustrative, not restrictive. The scope of the invention, is, therefore, indicated by the appended claims rather than by the foregoing description. All changes that come within the meaning and range of equivalency of the claims are to be embraced within their scope.

What is claimed is:

1. A connector for use in making an insulating composite wall structure, the connector comprising a body having a penetrating segment configured to reside within a first structural layer, a wailing segment configured to reside within a second structural layer, and a mesial segment between the penetration and trailing segments configured to reside within an insulating layer when the connector is in use, the body comprising:

two sidewalls that are spaced apart and that have a width or diameter;

a web portion extending between the two sidewalls, the web portion having a thickness that is less than the width or diameter of the sidewalls;

a tapered end configured to facilitate penetration of the connector through an insulating layer and a layer of unhardened structural material adjacent to the insulating layer;

orienting means, disposed at or near where the mesial and trailing segments intersect, for limiting penetration of the connector through an insulating layer at a predetermined depth; and anchoring means far anchoring at least one of the penetrating and trailing segments within a corresponding layer of hardened structural material.

2. A connection as recited in claim 1, the sidewalls and the web portion having a substantially I-shaped cross section within the mesial segment.

3. A connector is recited in claim 1, the sidewalls being substantially parallel and the web portion being substantially perpendicular to the sidewalls.

4. A connector is recited in claim 1, wherein the width or diameter of the sidewalls is at least 50% greater than the thickness of the web portion.

5. A connector is recited in claim 1, wherein the or diameter of the sidewalls is at least twice the thickness of the web portion.

6. A connector is recited in claim 1, wherein the width or diameter of the sidewalls is at least three times the thickness of the web portion.

7. A connector as recited in claim 1, the orienting means comprising at least one protrusion extending away from the web portion at or near where the mesial and trailing segments intersect.

8. A connector as recited in claim 1, the body comprising at least one of a cured resinous material or a thermoplastic material.

9. A connector as recited in claim 8, the body further comprising fibers within the cured resinous or thermoplastic material.

10. A connector as recited in claim 1, the anchoring means comprising at least one of a recess, a hole, a ridge, a protrusion, a flange, a depression, a notch, an extension, or other irregularity disposed on or within the body.

11. A connector as recited in claim 1, at least one of the sidewalls including an angled face at or near the tapered end.

12. A connector as recited in claim 1, at least one of the sidewalls terminating with a chisel-like edge at or near the vicinity of the tapered end.

13. A connector as recited in claim 1, the tapered end terminating with at least one substantially straight edge.

14. A connector as recited in claim 1, the tapered end terminating with at least one curved edge.

15. A connector as recited in claim 1, the tapered end terminating with a substantially sharp edge.

16. A connector as recited in claim 1, the tapered end terminating with a substantially blunt edge.

17. A connector as recited in claim 1, tho tapered end terminating with a plurality of spaced-apart points or edges.

18. A connector as recited in claim 1, the body further comprising a trailing wall extending at least partially between the sidewalls at an and of said body within the trailing segment.

19. A connector as recited in claim 1, further comprising one or more raised longitudinal ribs extending from at least one surface of the web portion.

20. A connector as recital in claim 1, the connector being sized and configured so as to provide from about 50% to about 100% composite action within an insulating composite wall structure.

21. A connector as recited in claim 1, the connector being sized and configured so as to provide at least about 60% composite action within an insulating composite wall structure.

22. A connector as recited in claim 1, the connector being sized and configured so as to provide at least about 70% composite action within an insulating composite wall structure.

23. A connector as recited in claim 1, the connector being sized and configured so as to provide at least about 80% composite action within an insulating composite wall structure.

24. A connector as recited in claim 1, the connector being sized and configured so as to provide at least about 90% composite action within an insulating composite wall structure.

25. A connector for use in making an insulating composite wall structure, the connector comprising a body having a penetrating segment configured to reside within a first structural layer, a trailing segment configured to reside within a second structural layer, and a mesial segment between the penetrating and trailing segments configured to reside within an insulating layer when the connector is in use, the body comprising:

two sidewalls that are spaced apart and tat have a width or diameter;

a web portion extending between the two sidewall; the web portion having a thickness that is less than the width or diameter of the sidewalls;

a tapered end configured to facilitate penetration of the connector trough an insulating layer and a layer of unhardened structural material adjacent to the insulating layer, the tapered end comprising a single elongate edge;

at least one protrusion extending laterally from the web portion at or near where the mesial and trailing segments intersect;

at least one of a recess, hole, ridge, protrusion, flange, depression, notch, or extension within the penetrating segment; and at least one of a recess, hole, ridge, protrusion, flange, depression, notch, or extension within the trailing segment.

26. A connector as recited in claim 25, the body further comprising a trailing wall extending at least partially between the sidewalls at an end of said body within the trailing segment.

27. A connector for use in making an insulating composite wall structure, the connector comprising a body having a penetrating segment configured to reside within a first structural layer, a trailing segment configured to reside within a second structural layer, and a mesial segment between the penetration and trailing segments configured to reside within an insulating layer when the connector is in use, the body comprising:

two sidewalls that are spaced apart and that have a width or diameter;

a web portion extending between the two sidewalls, the web portion having a thickness that is loss than the width or diameter of the sidewalls;

a tapered end comprising a plurality of spaced-apart edges or pointed tips configured to facilitate penetration of the connector through an insulating layer and a layer of unhardened structural material adjacent to the insulating layer;

at least one protrusion extending from the web portion or at least one of the sidewalls at or near where the mesial and wailing segments intersect; and anchoring means for anchoring at least one of the penetrating and trailing segments within a corresponding layer of hardened structural material.

28. A connector as recited in claim 27, further comprising one or more raised longitudinal ribs extending from at least one surface at the web portion.

29. A connector as recited in claim 27, further comprising one or more recess, formed between the spaced-apart edges or pointed ends.

30. A connector as recited in claim 27, the anchoring means comprising at least one of a recess, a hole, a ridge, a protrusion, a flange, a depression, a notch, an extension, or other irregularity disposed on or within the body.

31. A connector as recited in claim 27, the tapered end comprising at least three pointed tips.

32. A method of manufacturing a composite wall structure, comprising:

providing at least one connector as recited in any one of claim 1, 25 or 27;

placing an insulating layer adjacent to a first layer of unhardened structural material;

inserting the at least one connector through an exposed side of the insulating layer so that the mesial segment resides within the insulating layer end the penetrating segment resides within the first layer of unhardened structural material;

placing a second layer of unhardened structural material adjacent to the exposed side of the insulating layer in order for the trailing segment of the connector to reside within the second layer of unhardened structural material; and allowing the first and second layers of unhardened structural material to harden.

33. A method as recited in claim 32, the first and second layers of unhardened structural material hardening substantially simultaneously.

34. A method as recited in claim 32, the first and second layers of unhardened structural material hardening sequentially.

35. A method as recited in claim 32, the insulating layer having a plurality of grooves formed thereon.

36. A composite wall structure, comprising:

a first layer of structural material;

a second layer of structural material;

an insulating layer disposed between the first and second structural layers; and at least one connector according to any one of claim 1, 25 or 27, the penetrating segment of the connector being embedded within the first structural layer, the trailing segment of the connector being embedded within the second structural layer, and the mesial segment of the connector being disposed within the insulating layer.

37. A composite wall structure as recited in claim 36, the insulating layer having a plurality of grooves formed thereon.

38. A composite wall structure as recited in claim 36, the composite wall structure comprising a plurality of connectors having a composite action and being spaced apart so that the composite wall structure has a composite action in a range of about 15% to about 100%.

39. A composite wall structure as recited in claim 36, the composite wall structure comprising a plurality of connectors having a composite action and being spaced apart so That the composite wall structure has a composite action of at least about 50%.

40. A composite wall structure as recited in claim 36, the composite wall structure comprising a plurality of connectors having a composite action and being spaced apart so that the composite wall structure has a composite action of at least about 60%.

41. A composite wall structure as recited in claim 36, the composite wall structure comprising a plurality of connectors having a composite action and being spaced apart so that the composite wall structure has a composite action of at least about 70%.

42. A composite wall structure as recited in claim 36, the composite wall structure comprising a plurality of connectors having a composite action and being spaced apart so that the composite wall structure has a composite action of at least about 80%.

43. A composite wall structure as recited in claim 36, the composite wall structure comprising a plurality of connectors having a composite action and being spaced apart so that the composite wall structure has a composite action of at least about 90%.

44. A connector for use in making an insulating composite wall structure, the connector comprising a body having a penetrating segment configured to reside within a first structural layer, a trailing segment configured to reside within a second structural layer, and a mesial segment between the penetration and trailing segments configured to reside within an insulating layer when the connector is in use, the body comprising:

two sidewalls;

a web portion extending between the two sidewalls;

a tapered end configured to facilitate penetration of the connector through an insulating layer and a layer of unhardened structural material adjacent to the insulating layer;

orienting means for limiting penetration of the connector through an insulating layer at a predetermined depth;

anchoring means for anchoring at least one of the penetrating and trailing segments within a corresponding layer of hardened structural material; and a trailing wall extending at least partially between the sidewalls at an end of said body within the trailing segment.

* * * * *

CERTIFICATE OF CORRECTION

PATENT NO. : 6,895,720 B2
DATED : May 24, 2005
INVENTOR(S) : David O. Keith

It is certified that error appears in the above-identified patent and that said Letters Patent is hereby corrected as shown below:

Title page,
Item [57], ABSTRACT,
Line 13, before "anchor" remove "anchoring".

Column 2,
Line 27, after "the "Long '733" change "Patent))" to -- Patent") --.

Column 4,
Line 61, after "a spacing" change "patter" to -- pattern that --.

Column 7,
Line 48, change "angles faces" to -- angled faces --.

Column 8,
Line 40, after "means for" remove ",".
Line 46, after "The flange" insert -- 44 --.

Column 9,
Line 18, after "ribs 15a" insert -- ) --.

Column 10,
Line 67, before "completely," change "is" to -- it --.

Column 12,
Line 56, after "a spacing" change "patter" to -- pattern that --.

Column 13,
Line 5, change "wailing" to -- trailing --.
Lines 29, 32, 35 and 38, after "connector" change "is" to -- as --.
Line 66, before "tapered" change "tho" to -- the --.

Column 14,
Line 8, change "recital" to -- recited --.
Line 35, after "apart and" change "tat" to -- that --.
Line 37, after "two sidewall" change ";" to -- , --.
Line 41, after "connector" change "trough" to -- through --.

UNITED STATES PATENT AND TRADEMARK OFFICE

CERTIFICATE OF CORRECTION

PATENT NO. : 6,895,720 B2
DATED : May 24, 2005
INVENTOR(S) : David O. Keith

It is certified that error appears in the above-identified patent and that said Letters Patent is hereby corrected as shown below:

Column 15,
Line 2, change “loss” to -- less --.
Line 11, change “wailing” to -- trailing --.
Line 17, before “the web portion.” change “at” to -- of --.
Line 19, change “recess,” to -- recesses --.
Line 35, after “insulating layer” change “end” to -- and --.

Column 16,
Line 16, before “the composite” change “That” to -- that --.

Signed and Sealed this

Twenty-third Day of August, 2005

JON W. DUDAS
*Director of the United States Patent and Trademark Office*